United States Patent [19]
Hardwick, III

[11] 3,759,088
[45] Sept. 18, 1973

[54] METHOD OF AND APPARATUS FOR TESTING THE QUALITY OF BONDED CONNECTIONS OF SEMICONDUCTOR DEVICES

[75] Inventor: Nathan Everette Hardwick, III, Bethlehem, Pa.

[73] Assignee: Bell Telephone Laboratories, Incorporated, Berkeley Heights, N.J.

[22] Filed: June 2, 1972

[21] Appl. No.: 259,272

[52] U.S. Cl. ..................... 73/37, 73/88 B, 239/545
[51] Int. Cl. ............................................ G01m 3/02
[58] Field of Search ............................. 73/37, 88 B; 15/300 R, 317, 395, 405; 239/543, 545

[56] References Cited
UNITED STATES PATENTS

| | | | |
|---|---|---|---|
| 3,413,839 | 12/1968 | Clark et al. | 73/37 |
| 3,559,054 | 1/1971 | Bowers | 73/37 X |
| 3,096,225 | 7/1963 | Carr et al. | 239/543 X |
| 498,133 | 5/1893 | Mauermann | 15/300 R X |
| 2,335,604 | 11/1943 | Ohlinger | 239/543 X |

*Primary Examiner*—Richard C. Queisser
*Assistant Examiner*—Daniel M. Yasich
*Attorney*—W. L. Keefauver

[57] ABSTRACT

An apparatus is disclosed for the nondestructive testing of the integrity of a semiconductor device of the beam lead or flip chip type after it has been bonded to a mounting substrate. The apparatus comprises an air blast tester having at least two opposed air ducts to produce impinging fluid jets beneath the bonded chip. The opposed impinging jets result in a pressure buildup because of the deceleration of flow thereby resulting in a force on the underside of the semiconductor chip.

2 Claims, 2 Drawing Figures

METHOD OF AND APPARATUS FOR TESTING THE QUALITY OF BONDED CONNECTIONS OF SEMICONDUCTOR DEVICES

BACKGROUND OF THE INVENTION

This invention relates to the testing of semiconductor device assemblies and particularly to the stress testing of bonded semiconductor chips mounted on substrates. It is particularly directed to the testing of both discrete and integrated circuit semiconductor devices of the type having relatively massive and rigid interconnecting means as typified, for example, by the beam lead and flip chip arrangements.

U.S. Pat. No. 3,636,755, granted Jan. 25, 1972 to E. J. Boore and D. M. Sutter, discloses a related type of tester for applying force to bonded semiconductor devices. It is based primarily on the use of an exhaust diffuser to reduce the pressure at the upper surface of a semiconductor device thereby to produce a differential between the pressure on the lower and upper faces resulting in a force tending to life the chip from the substrate. This apparatus, although completely satisfactory, may require some movement of the diffuser head during the test to enable the stepless stressing of the semiconductor device structure. In addition, the diffuser tends to obscure the semiconductor chip being tested which likewise may be disadvantageous in certain situations.

In U.S. Pat. No. 3,371,780 to K. Clark and U.S. Pat. No. 3,413,839 to K. Clark and W. J. Schuelke, there is disclosed an air blast tester for applying a fluid jet to a bonded semiconductor device. In these disclosures a single jet is applied successively to the top surface, the edge, and to the volume beneath the semiconductor chip for the purpose of stressing the bonds connecting the semiconductor device to its substrate. Although this arrangement may provide satisfactory results for certain purposes, it has been found that a single jet of this type does not produce the necessary force on the underside of the semiconductor chip to adequately stress the chip bonds in the direction most likely to undergo failure. Accordingly it is an object of this invention to overcome certain disadvantages of prior art testers as set forth above.

SUMMARY OF THE INVENTION

In accordance with this invention, stress of a predetermined level is applied to a bonded semiconductor device of the beam lead or flip chip type by means of apparatus comprising at least a pair of opposed fluid jets arranged to provide fluid flow in opposite directions so as to impinge under the bonded semiconductor chip being tested. Advantageously these opposed fluid flows are provided by what will be termed plane wall jets in which the flow is produced from an orifice immediately adjacent the surface of the substrate on which the semiconductor device is mounted.

The important aspect of this invention resides in the arrangement of the fluid flows in opposition under the chip so that they impinge upon one another directly under the chip and thus produce a deceleration of flow thereunder. When these flows are decelerated there is a consequent stagnation pressure increase at this point resulting in the application of an upward force against the underside of the semiconductor chip. This pressure is proportional to the difference between the square of the velocity of the emerging fluid jet and the square of the velocity of the jet at the place of impingement under the chip. Thus, if the jet is decelerated substantially to zero the pressure is a maximum.

For a given set of test conditions, including the parameters of the fluid flow, nozzle spacing, and dimensions of the semiconductor chip, as well as clearance under the chip, a calibration can be made of the force applied to the underside of the semiconductor chip so that uniformity of testing using this arrangement is readily achieved. It will be understood that in addition to the basic configuration of a single pair of opposed jets, apparatus in accordance with this invention may also comprise more than two jets disposed in substantial opposition around the periphery of the semiconductor chip. Typically for square semiconductor chips, most generally used, two pairs of opposed jets provide a very convenient configuration.

DESCRIPTION OF THE DRAWING

The invention will be more completely understood from the following detailed description taken in conjunction with the drawing in which.

DETAILED DESCRIPTION

Figure 1:
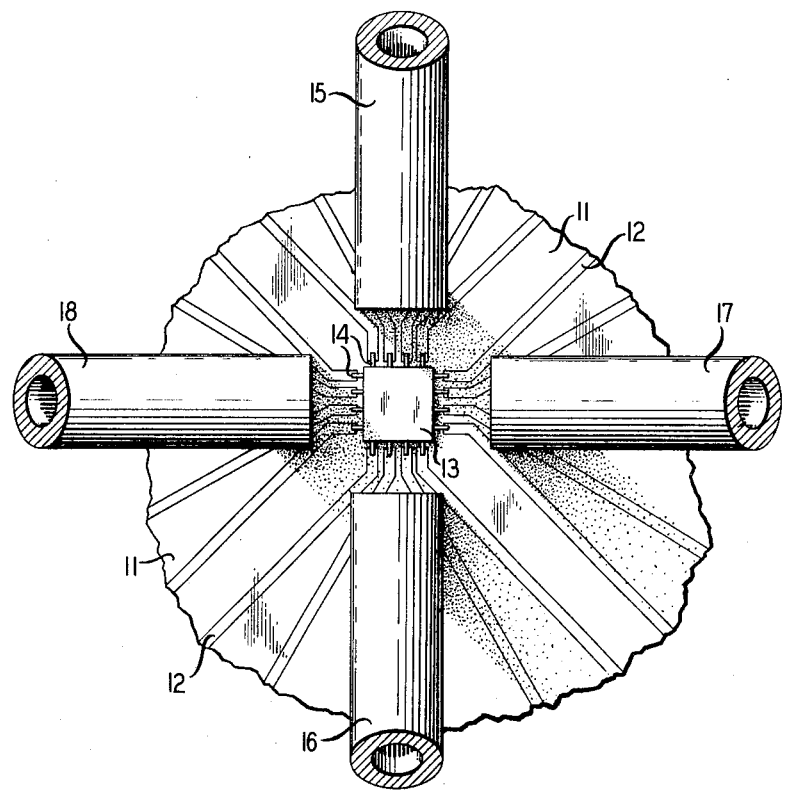
FIG. 1 is a plan view of an air blast tester in accordance with this invention having two pairs of opposed jets.
Figure 2:
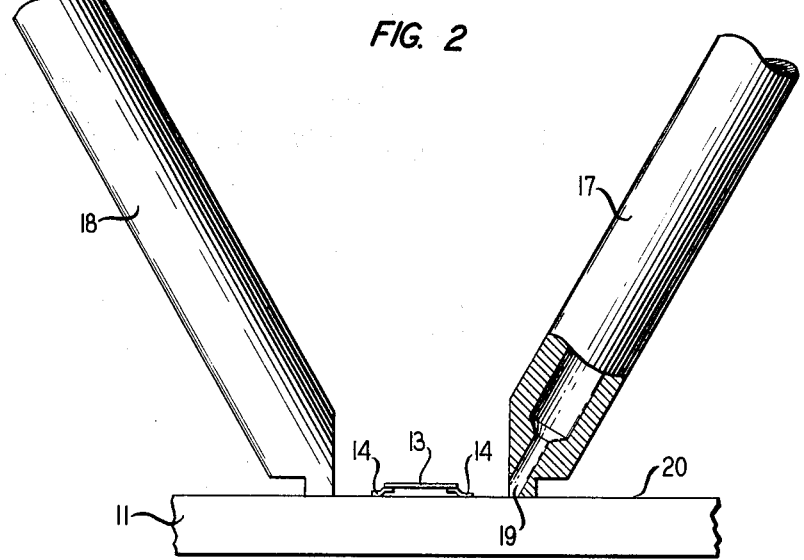
FIG. 2 is a side elevation view, partially in section, of the apparatus of FIG. 1.

Referring to the drawing in which like reference numerals are used in both FIGS. 1 and 2, where appropriate, a portion of a mounting substrate 11 is shown having an array of conductors 12 formed on the surface thereof. Such conductors 12 may be simply interconnecting means to external connectors in a device encapsulation or may be parts of a further circuit configuration, typically of the type referred to as thin film apparatus. Mounted upon the substrate and attached to the conductors 12 is a semiconductor chip 13 having a plurality of beam leads 14. The chip is shown as having 16 beam leads 14, however, devices of this type may have a variety of leads and may not necessarily be of a symmetrical configuration as shown. Moreover, the invention applies also to semiconductor devices of the flip chip type in which metal protuberances or solder balls on one face of the chip provide both the attaching and interconnecting means. In both configurations there is a considerable clearance volume between the underside of the semiconductor chip and the surface of the mounting substrate. Techniques for attaching semiconductor devices in this manner are well known in the art as exemplified, for example, by U.S. Pat. No. 3,529,729 of J. E. Clark.

Four air nozzles 15, 16, 17 and 18 are arranged in opposed pairs at the sides of the semiconductor chip 13. By means not shown and not a part of this invention, the nozzles 15, 16, 17 and 18 and the carriage for the semiconductor device substrate are mounted to enable movement in three dimensions so as to permit exact placement of the air blast tester immediately adjacent the devices being tested. Various mechanical linkages obviously may be provided for enabling such movement.

Referring particularly to FIG. 2, the tips of fluid nozzles 17, 18 are shown in some detail. Typically, the fluid may be either clean filtered air or if demanded by particular conditions, as inert gas such as argon or helium may be applied. The orifice 19 of each nozzle is shown as being in immediate contact with the surface 20 of the substrate 11. Inasmuch as the air jet impinges immediately upon the substrate surface and is constrained to flow along parallel thereto, this configuration is referred to as a plane wall jet. This arrangement is contrasted with an arrangement in which the nozzle is not resting upon the substrate surface but is spaced away somewhat from this surface in an arrangement referred to as a free jet. It will be understood that both jet configuration may be used in connection with this invention but the description herein will be particularly directed to the wall jet arrangement.

The fluid jet emerging from the opposing nozzles 17 and 18 is constrained by the substrate surface 20 and flows, in accordance with the general laws of fluid flow, under the semiconductor chip 13 where the opposing flows impinge upon one another. When these flows are decelerated by such impingement, there is a pressure increase at that point of impingement, $A$, which is found from the Bernoulli-Euler relation to be $$p_A = p_0 + \rho/22(V_0^2 - V_a^2)$$

where $p_A$ is the pressure and $V_A$ the velocity of the jet under the chip at point $A$; $p_0$ is the static pressure and $V_0$ is the velocity of the emerging fluid jet; and $\rho$ is the density of the fluid. Accordingly, it will be seen that without the pressure buildup due to deceleration of flow caused by impingement of the air jets, $p_A$ will not reach a value sufficient to stress the bonded semiconductor device. On the other hand, $p_A$ does reach a maximum when $V_A$ falls to zero.

The configuration of the nozzles 15, 16, 17 and 18 is not critical from the standpoint as to whether a uniform cross section pipe or a convergent nozzle is used. It has been found advantageous to provide a fluid pressure such that the gas emerges from the ducts at a velocity equal at least to Mach 1 and in greatly underexpanded conditions. The use of the plane wall jet has been found to result in less momentum loss in the fluid impinging beneath the chip. The angle of the nozzle is not particularly critical but is governed to a greater degree by the clearance required to enable the apparatus to contact the semiconductor assemblies. The plane wall jet configuration has a further advantage in that by placing the nozzle tips directly upon the substrate surface, the dimensional clearances are inherently determined. The nozzle tips may be shaped as shown in FIG. 2 so as to minimize the area of the substrate contacted by the tip.

The duct openings 19 advantageously are as close as possible to the sides of the semiconductor chip 13 but in any case it will be apparent that the chip itself need not be obscured by the test apparatus during the course of testing. Moreover, the opposed nozzles may comprise a series of parallel nozzles or even a large elongated nozzle on each side of a line of semiconductor devices if such is permitted by the particular apparatus assembly. The particular arrangement of nozzles to suit the apparatus under test will be obvious in view of the disclosure herein, observing only that the significant aspect is the substantially opposed jet flow so as to produce a pressure buildup beneath the chip being stressed. In other words, pressure buildup in accordance with this invention is a consequence of the mutual impingement of fluid jet flows beneath the bonded element.

Failure of bonded connections may be observed visually or by an open circuit electrical test as is already well known in the art.

What is claimed is:

1. The method of applying stress to the bonded connections between a semiconductor chip and a substrate having an array of contacts thereon, said method including the steps of supporting said substrate having said chip spaced from and bonded to said substrate and subjecting the chip to at least a pair of oppositely disposed jets of a fluid medium, each said jet directed under said chip so as to impinge upon one another under said chip to produce a pressure buildup and a consequent upward force against the underside of said bonded chip 2. Apparatus for applying stress to a semiconductor chip bonded and spaced from a substrate having an array of contacts thereon, said apparatus comprising means for supporting said substrate and means for applying a pair of fluid jets in opposed relation so as to impinge directly between said bonded semiconductor and said substrate.

* * * * *